May 14, 1935.  O. M. STOUT ET AL  2,001,074
WRAPPING MACHINE
Filed July 31, 1934   2 Sheets-Sheet 1
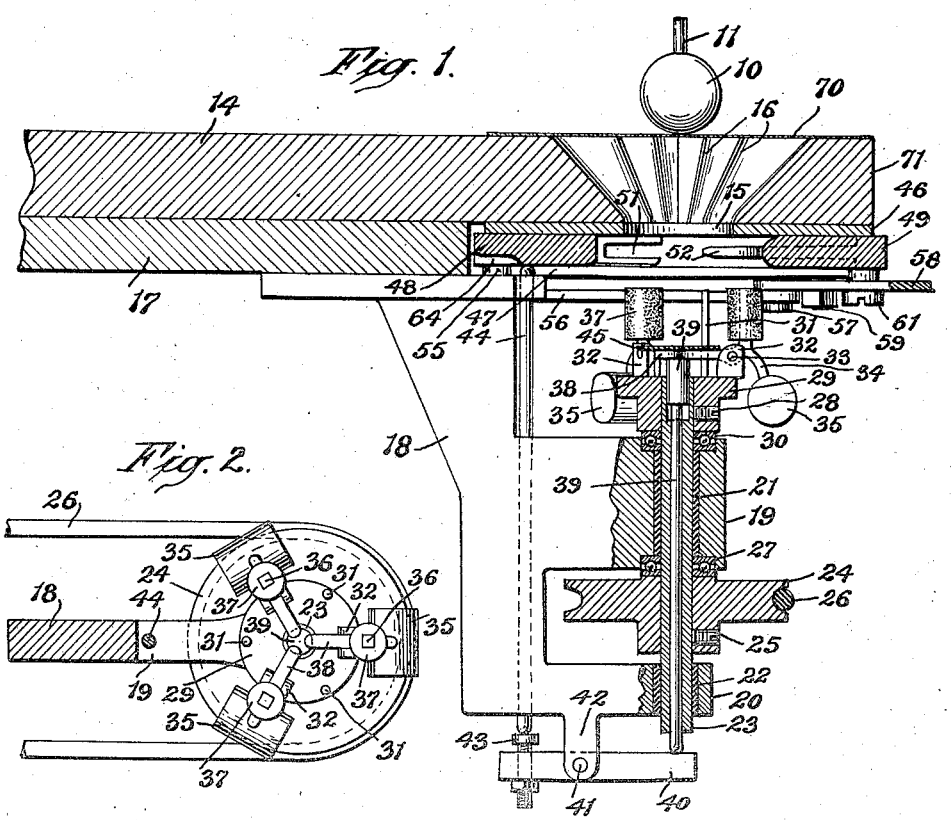
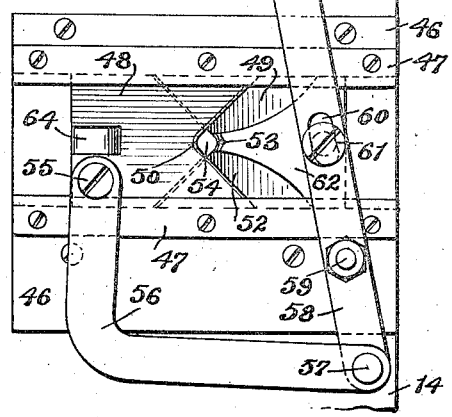
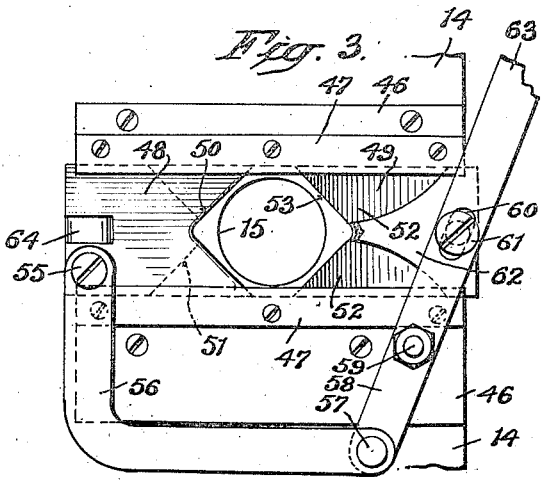
INVENTORS
Oscar M. Stout & Hans Hoyer
BY
Harry Radzinsky
ATTORNEY May 14, 1935.  O. M. STOUT ET AL  2,001,074

WRAPPING MACHINE

Filed July 31, 1934  2 Sheets-Sheet 2

INVENTOR
Oscar M. Stout & Hans Hoyer
BY
ATTORNEY

Patented May 14, 1935

2,001,074

UNITED STATES PATENT OFFICE 2,001,074

WRAPPING MACHINE

Oscar M. Stout, Garden City, and Hans Hoyer, Woodhaven, N. Y., assignors to Sweets Company of America, Inc., New York, N. Y., a corporation of Virginia Application July 31, 1934, Serial No. 737,700

11 Claims. (Cl. 93—5)

This invention relates to wrapping machines, and more particularly to the type used for wrapping candies or other articles which are supported on a stick. The object of the invention is to provide a simple and efficient device which will speedily and neatly apply a wrapper over and about the candies.

More particularly, the invention utilizes a continuously rotating support on which a candy of substantially globular form and provided with a projecting stick, is held together with the wrapper to be applied about the candy. A contracting device draws the wrapper about the candy and toward the stick, and gripping fingers rotated with the support and moved inwardly by centrifugal force operative on their weighted ends, cause the candy to be rotated and the wrapper to be twisted about the stick.

Figure 5:
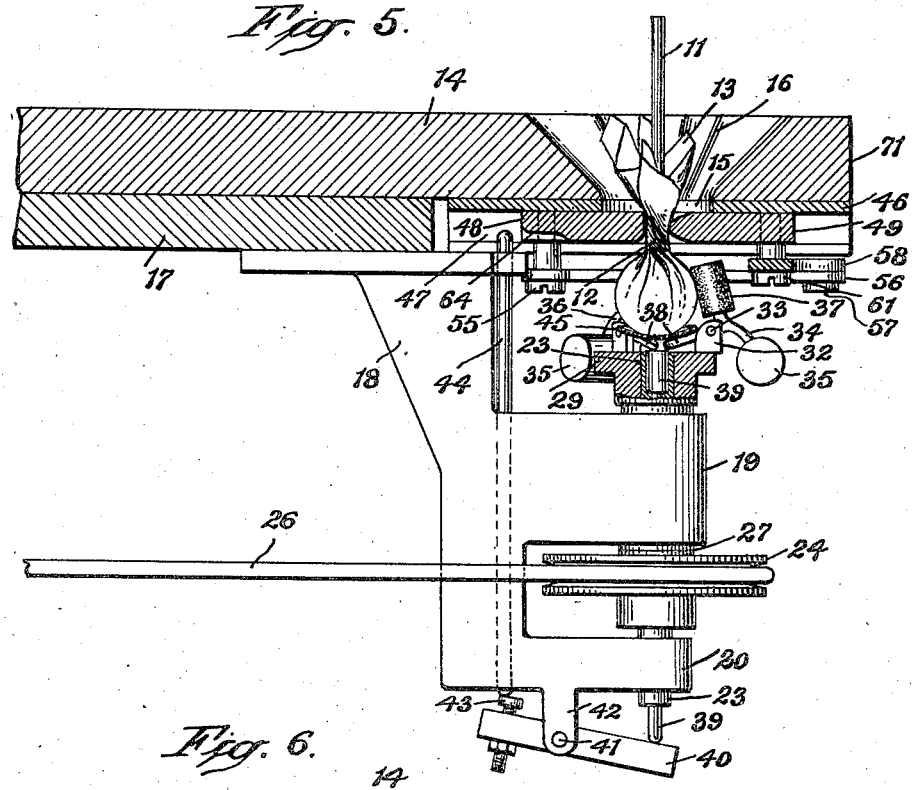
Figure 6:
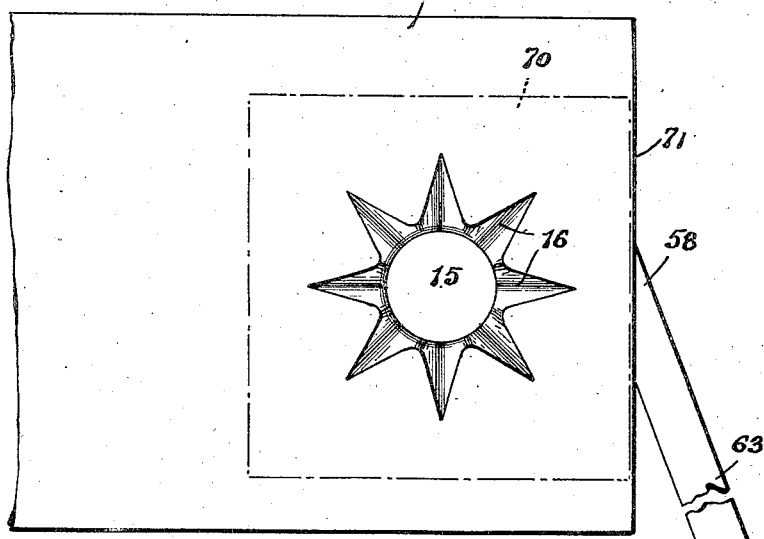

In the accompanying drawings, wherein the preferred embodiment of the invention is shown, Fig. 1 is a vertical sectional view through the machine; Fig. 2 is a plan view with parts in section, of the gripping fingers and associated parts; Fig. 3 is a view of the underside of the means for contracting the wrapper about the candy stick, with such means shown in open position; Fig. 4 is a similar view of the structure shown in Fig. 3 with the wrapper-contracting means in closed position; Fig. 5 is a side elevation of the structure in Fig. 1, with parts in section showing how the wrapper is applied to the candy; and Fig. 6 is a plan view of the apparatus showing the opening through which the candy and wrapper is thrust.

The candy 10 to be wrapped is shown in Fig. 1 where it will be seen that the same is of substantially globular form although it may be otherwise shaped. The candy is provided with a projecting stick 11 which is held in the hand while the candy is being consumed. The wrapper as applied to the candy is shown in Fig. 5, said wrapper being applied about the globular body 10 of the candy and twisted tightly around the stick thereof, where it enters the candy, as shown at 12, leaving the projecting or skirt portion 13 of the wrapper extending freely in a series of folds.

At 14 is shown a support secured on a table 17, and provided with an opening 15 through which the candy and wrapper are thrust to reach the wrapping mechanism. Extending radially from the aperture 15 are a plurality of recesses or grooves 16 which serve to fold or crease the wrapper as it is forced through the opening 10 to reach the wrapping mechanism.

Secured to the underside of the support 17 is a downwardly extending bracket 18, provided with laterally projecting spaced lugs 19 and 20 which carry tubular bearings 21 and 22 respectively, in which a vertically disposed tubular shaft 23 rotates. Mounted on the shaft 23 is a pulley 24 which is fixed to the shaft by the screw 25 and driven by a belt 26 extending from an electric motor or other suitable source of power. A ball thrust bearing 27 is located between the pulley 24 and the lug 19, as clearly shown in Fig. 1. Through the driving arrangement described, the shaft 23 is constantly rotated. Fixed on the upper end of the shaft 23 by the screw 28 is a collar 29 forming a head which rests on a thrust ball-bearing 30 located at the upper end of the lug 19. Rising vertically from the upper face of the head 29 are spaced rods or pins 31 which guide and confine the candy 10 between them when the candy is manually forced downward to wrapping position, as will be hereinafter explained.

The head 29 is also provided on its upper surface with three pairs of ears 32, each of said pairs of ears acting as a support for a pivoted candy-gripping member. Each of the gripping members is in the form of a three-armed element pivoted at 33 in the ears 32, the downwardly dependent arm 34 of each of the gripping members carrying a weight 35. On the squared upwardly extending arm 36 (Fig. 2) of each gripping member is carried a cylindrical rubber sleeve 37, which is non-rotatably secured on the arm 36. The inwardly extending arm 38 of each of the gripping members extends inwardly toward the center of the head 29. The arms 38 of the three gripping members come close together at the center of the head 29 in position to be normally pressed upward by the head of a vertically movable stem 39, which is located and movable within the tubular shaft 23. The lower end of the stem 39 rests against a rocking arm 40 near one of its ends. Arm 40 is pivoted at 41 in ears 42 extending downwardly from the bracket 18. The arm 40 is provided at its opposite end with an adjustable tappet 43 which bears against the lower end of a vertically disposed rod 44 movable up and down in the bracket 18. Resting upon the three inwardly extending arms 38 of the gripping members is a flexible disc 45 of rubber or similar material which acts as a seat for the candy and wrapper when the same are forced downwardly through the opening 15 in the table 14.

Secured to the underface of the table 14 is a plate 46 which is provided with a pair of spaced guides 47 in which a pair of guide plates or jaws 48 and 49 are slidable to and from one another. The plate or jaw 48 is notched as shown at 50 and is recessed at 51 to receive the thinned complementary-shaped portions 52 of the plate or jaw 49. The plate 49 is notched as shown at 53, similarly to the notched part 50 of plate 48. When the two plates 48 and 49 are moved toward one another by connected levers, as will be indicated hereinafter, they form a contracted opening 54, as shown in Fig. 4, which draws the wrapper closely about the stick 11 at the point where it enters the candy, and by the action of the gripping members which causes the candy and wrapper to be rotated, the wrapper is twisted about the stick 11 as shown at 12 in Fig. 5.

Secured to the bottom of the plate 48 by the screw 55 is a bent arm 56 which has its end pivotally connected at 57 to the end of a lever 58, pivoted at 59 to the plate 46. The lever 58 is provided with a slot 60 which engages a pin 61 secured to and projecting from the thickened portion 62 of the plate 49. The lever 58 is formed with a projecting handle portion 63 which projects beyond the front edge 71 of the table 14 in position to be easily grasped and manipulated by the operator, to move it to cause the jaws or plates 48 and 49 to move toward or away from one another at the proper time. The underface of the plate 48 is formed with a groove 64, which at a certain time moves past the end of the stem 44, allowing said stem 44 to rise and the stem 39 to descend to the position shown in Fig. 5.

The operation of the wrapping device is briefly as follows:

The apparatus in readiness for the wrapping of candy is shown in Fig. 1. It will be there seen that a wrapper 70 has been placed on the support 14 directly over the aperture 15 therein. The pulley 24, driven by the belt 26, causes a continuous rotation of the shaft 23 and parts carried thereby which include the head 29 and the three gripping members supported thereon. At this time, the lever 58 is in its outward or released position as shown in Fig. 6, so that the notched plates or jaws 48 and 49 are in their position of greatest separation, as shown in Fig. 3, and the aperture or opening 15 in the support 14 is unobstructed. A candy to be wrapped is held by its stick directly over the wrapper, with the stick 11 projecting upwardly and the candy is thrust downwardly through the radial groove 16 and aperture 15 until it seats against the supporting disc 45.

While this is taking place, the stem 39 is holding the inwardly extending arms 38 of the gripping members upwardly so that said members are held in the position shown in Fig. 1. As soon as the candy seats upon the disc 45, the lever 63 is manually thrust inwardly toward the table, which action draws the plates or jaws 48 and 49 toward one another to cause them to form the contracted opening 64 between them. This movement of the plates 48 and 49 toward one another causes them to contract or draw inwardly parts of the wrapper about the globular candy body 10. As plate 48 moves inwardly toward the plate 49, it moves past the upper end of the stem 44, said plate moving the groove 64 beyond the stem, as shown in Fig. 5. When this occurs, the pressure imposed by the operator on the candy causes the arms 38 to force the stem 39 downwardly. When the stem 39 descends, as shown in Fig. 5, the weights 35 on the arms 34 of the gripping members are free to be thrown upwardly and outwardly by centrifugal force, causing the cylindrical rubber gripping members 37 to move inwardly into contact with the candy and wrapper, causing the candy and its wrapper to be rotated with the head 29 and attached shaft 23. The portion of the wrapper located at the point where the stick enters the candy being then held in the contracted opening 54, said portion of the wrapper has its rotation frictionally resisted by its contact with the edges of the opening 54 and this part of the wrapper is thus tightly twisted about the stick as indicated at 12 in Fig. 5. The lever 58 is then thrown outwardly, which draws the jaws or plates 48 and 49 apart, and permits the wrapped candy to be lifted upwardly through the aperture 15 in the table.

What we claim is:

1. A wrapping device comprising, a rotating support, a plurality of weighted arms pivotally mounted on said support and rotated therewith, fingers carried by said arms and adapted to be brought against an article and a wrapper, by centrifugal force acting on the weighted arms during rotation of the support to hold the wrapper against the article.

2. A wrapping device comprising, a rotating support on which a candy is brought to rest, a plurality of weighted fingers pivotally mounted on said support and rotated therewith, means carried by said fingers for contact against a candy and a wrapper by centrifugal force acting on the weighted fingers during rotation of the support to rotate the candy and wrapper, and means for contracting a part of the wrapper and twisting it about a stick projecting from the candy during rotation of the candy.

3. A wrapping device for applying a wrapper about an article on a stick, comprising a support and means for rotating the same, gripping members pivotally mounted on the support and rotated therewith, means on said gripping members tending to cause them to be thrust by centrifugal force toward a wrapper-enclosed article held on the support to cause the wrapper and article to be rotated with the support, means for contracting and twisting a part of the wrapper about the stick adjacent to the point where the stick enters the article, means for holding the gripping members in a position of separation to enable an article to be inserted between them, and means operated by movement of the wrapper-contracting means for releasing the holding means for the gripping members.

4. A wrapping device for applying a wrapper about a ball-shaped candy on a stick, comprising a support and means for rotating the same, gripping members pivotally mounted on the support and rotated therewith, weights on said gripping members tending to cause said members to be thrust by centrifugal force toward a wrapper-enclosed candy ball held on the support to cause the candy and wrapper to be rotated with the support, means for contracting a part of the wrapper about the stick adjacent to the point where it enters the candy and twisting the wrapper at that point, means for holding the gripping members in a position of separation to enable a candy to be inserted between them, and means operated by closing movement of the wrapper-contracting and twisting means for releasing the holding means for the gripping members.

5. A wrapping device for candy mounted on a stick comprising, a rotating support, a plurality of pivoted fingers on the support and rotated therewith to grip the candy and cause it to be rotated with the support, stop means for holding said fingers in a position of separation to permit the entry of a candy between them, means for contracting and twisting a part of the wrapper about the stick, and release means operated by closing movement of the wrapper-contracting means for withdrawing the stop means to permit inward movement of the fingers toward one another.

6. A wrapping device for an article on a stick comprising, a support and means for continuously rotating the same, a plurality of fingers pivotally mounted on said support, each of said fingers being provided with a wrapper-engaging surface, each of said fingers being weighted so that by centrifugal force exerted by rotation of the support, the wrapper-engaging surfaces on the fingers are moved toward one another to engage and hold the wrapper and article positioned between them, a fixed support provided with an opening through which an article and its wrapper are thrust to reach a position between the fingers, movable means for contracting said opening to constrict the wrapper about the stick projecting from the article, means for holding the wrapper-engaging surfaces on the fingers in a position of separation to permit the entry of the article and wrapper between them, and means operated upon contracting movement of the opening, to free the fingers and permit their wrapper-engaging surfaces to be swung inwardly against the wrapper to cause it and the article enclosed by it to be rotated with the support.

7. A wrapping device for an article on a stick comprising, a support and means for rotating the same, a plurality of fingers pivotally mounted on said support, each of said fingers being provided with a wrapper-engaging surface, each of said fingers having a weighted outer end so that by centrifugal force exerted by rotation of the support, the wrapper-engaging surfaces on the fingers are moved toward one another to engage the wrapper and article positioned between them, a fixed support provided with an opening through which an article and its wrapper are thrust to reach a position between the fingers, movable jaws for contracting said opening to constrict the wrapper about the stick projecting from the article, means for holding the fingers in a position of separation to permit the entry of the article and wrapper between them, and means operated by closing movement of the jaws to free the fingers and permit them to move the wrapper-engaging surfaces into contact with the wrapper to rotate the wrapper and the article.

8. In a wrapping device of the character described, a fixed support having an opening through which an article on a stick and an underlying wrapper is thrust, a rotating support receiving the article and the wrapper, and weighted grippers movable toward one another and held by centrifugal force against the wrapper to cause the wrapper and article to be rotated with the rotating support.

9. In a wrapping device of the character described, a rotating support against which an article on a stick and a wrapper is held, gripping means carried by and rotated with the support, movable means for contracting and twisting a portion of the wrapper about the stick, and means controlled by the contracting and twisting means for holding the gripping means inoperative while the wrapper-contracting and twisting means is in an open position.

10. A wrapping device of the character described comprising, a fixed support having an aperture through which an article on a stick and a wrapper are thrust, means movable below the opening for partly closing the same and contracting a part of the wrapper about the stick, a continuously rotating support against which the article and wrapper are manually placed, pivoted fingers on said support held in an inoperative position while the aperture through which the article and wrapper are thrust is unobstructed, a rod having parts disposed between and holding the fingers in a position of separation during insertion of the article and wrapper therebetween, and means controlled by the wrapper-contracting means for freeing the fingers to enable them to be swung into contact with the wrapper to hold the wrapper and article on the rotating support while the wrapper-contracting means contracts and twists a part of the wrapper about the stick.

11. A wrapping device provided with a rotating support on which an article to be wrapped is held, a plurality of freely pivoted gripping members carried by and rotated with the support, said gripping members being mounted for free inward movement by the urge of centrifugal force during rotation of the support to engage the article to be wrapped and its wrapper to cause the wrapper and the article to be rotated with the support, and means for engaging a part of the wrapper while the wrapper and article are being rotated to cause said part of the wrapper to be twisted about the article to be wrapped.

OSCAR M. STOUT.
HANS HOYER.